F. S. LACK.
VEHICLE WHEEL.
APPLICATION FILED JUNE 12, 1918.
1,313,489.
Patented Aug. 19, 1919.
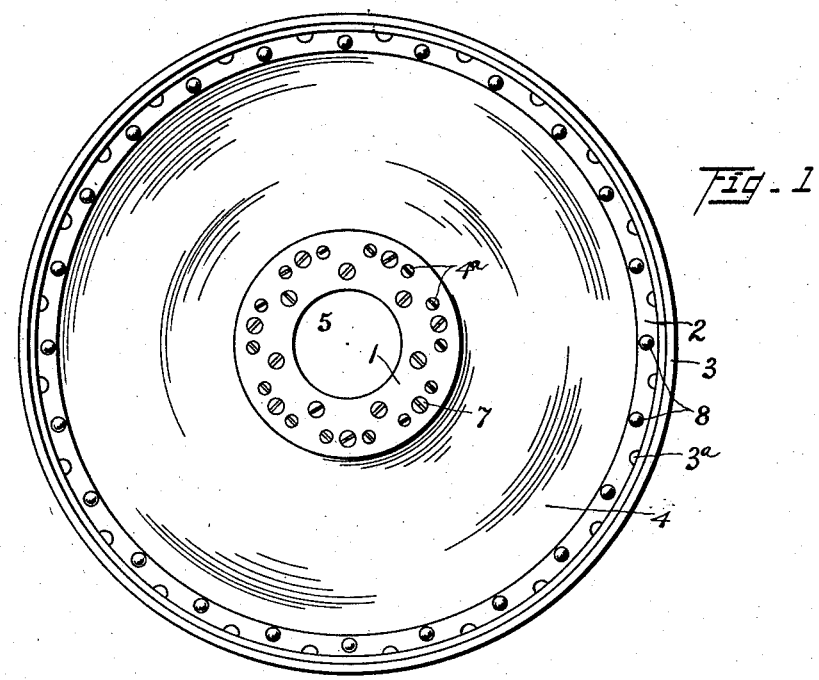
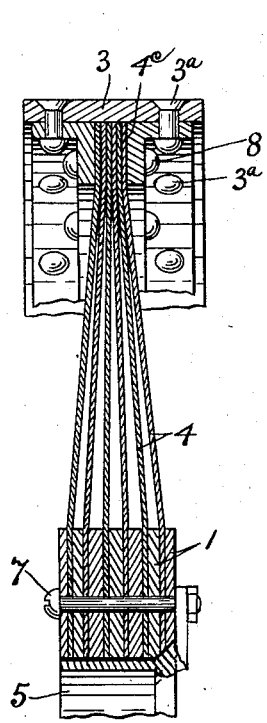
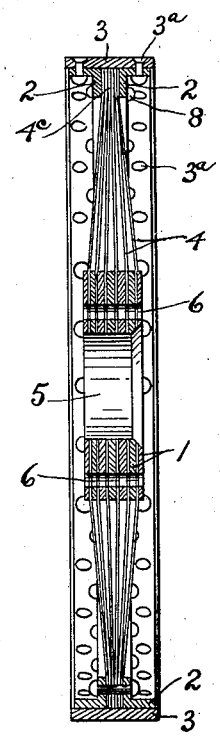
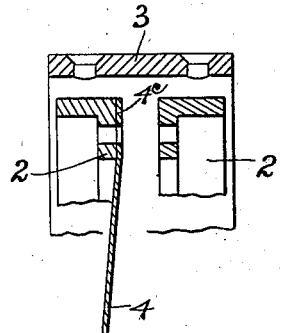
Fig. 1
Fig. 3
Fig. 2
Fig. 4
Inventor
F. S. Lack

UNITED STATES PATENT OFFICE.

FRED S. LACK, OF PADUCAH, KENTUCKY.

VEHICLE-WHEEL.

1,313,489.     Specification of Letters Patent.     Patented Aug. 19, 1919.

Application filed June 12, 1918. Serial No. 239,503.

*To all whom it may concern:*

Be it known that I, FRED S. LACK, a citizen of the United States, residing at Paducah, in the county of McCracken and State of Kentucky, have invented certain new and useful Improvements in Vehicle-Wheels, of which the following is a specification.

My invention relates to improvements in vehicle wheels, the primary object of the invention being to provide a generally improved vehicle wheel which will be exceedingly simple in construction, cheap of manufacture, and efficient in use.

A further object of the invention is the provision of a generally improved metallic wheel embodying improved hub and felly members connected by means of an improved wheel body, comprising a plurality or series of spaced disks, and improved means for connecting and mounting said disks at the hub and felly portions of the wheel.

A still further object is the provision of an improved wheel not only possessing great strength, but one which is particularly designed and adapted to take up the various circumferential and lateral strains and stresses during the various exigencies of actual service, as well as one possessing the requisite degree of resiliency and flexibility for taking up the various shocks and restoring and maintaining the parts in their normal position.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a side elevation of a wheel constructed in accordance with my invention.

Fig. 2, a central cross sectional view of the same.

Fig. 3, an enlarged fragmentary sectional view of the wheel body.

Fig. 4, a fragmentary disassembled cross sectional view of the hub and felly portions of the improved wheel, some of the hub rings and body disks being removed for the purpose of clearer illustration of the parts.

Similar numerals of reference designate like parts throughout all the figures of the drawings.

The improved wheel comprises suitable hub and felly members, said hub member preferably comprising a plurality or series of hub rings 1, and said wheel felly consisting, in the present instance, of a pair of laterally spaced felly rings 2, the latter being surrounded by and connected to a suitable tire or rim member 3, in any suitable and convenient manner, as for example,— by means of suitable fastening members or elements $3^a$, in the present instance, in the specific form of rivets.

The improved wheel body, proper, comprises a plurality or series of laterally spaced disks 4, in the present instance six in number, interposed between and secured to the hub rings 1, in any suitable and convenient manner, as for example,—by means of suitable fastening members, in the present instance, in the specific form of screws $4^a$, passing through suitable openings $1^a$, in the hub rings, and registering openings $4^b$, in the wheel disks. The hub rings 1, and wheel disks 4, are each provided with a suitable axle or hub opening conjointly forming a central wheel opening 5, adapted to receive a suitable wheel axle or hub thimble member, as desired, and as a convenient means of securing the wheel to the wheel axle or hub thimble, the hub rings 1, and disks 4, are preferably provided with a plurality of bolt receiving openings 6, adapted to receive and contain a plurality of fastening bolts 7, for securing the axle or thimble member to the wheel, as illustrated most clearly in Fig. 3, of the drawings.

The above described arrangement of the openings in the hub rings and wheel disks all surrounding and bearing against the wheel axle or hub member greatly strengthens the parts and also prevents any shearing action on the fastening members.

The disks 4, are preferably formed of relatively thin flexible material and preferably comprise three or more members spaced apart at the hub portion of the wheel and radially converging toward and abutting against each other at their outer peripheries, as at $4^c$, the abutting portions $4^c$, being interposed between the felly rings 2, and suitably secured thereto, in the present instance, by means of rivet members 8, passing through suitable openings in the felly rings 2, and the abutting portions $4^c$, of the disks.

The felly rings 2, are preferably of angular shape in cross section, as shown, so as to conveniently receive the fastening members 3ª, and 8, and it will be apparent that the arrangement of the relatively thin spaced radially converging disks, is such, as not only to provide great strength at the hub portion of the wheel, but to admirably adapt the wheel to receive and take up lateral stresses while in service, and it will be understood that the wheel felly may be formed in any suitable and convenient manner for receiving and carrying any desired form of tire or tread member.

By the term "series" as applied to the metallic disk 4 and hub rings 1, and as set forth in the claims, is meant three or more of such disks or rings and excludes a wheel having but two of such disks or rings.

From the foregoing description, taken in connection with the accompanying drawings, the operation and advantages of my invention will be readily understood.

Having thus described one of the embodiments of my invention, what I claim and desire to secure by Letters Patent is,—

1. A wheel, comprising spaced metallic hub and felly rings, and a series of spaced metallic disks interposed between and secured to said hub and felly rings, said hub rings and disks being each provided with a central opening adapted to receive an axle or hub member, and said disks converging toward said felly rings at uniform angles to each other and abutting against each other between said felly rings.

2. A wheel, comprising metallic hub and felly members, and a series of radially and uniformly converging metallic disks extending between and secured to said hub and felly members, said hub members and disks being provided with central registering openings and being secured to each other by removable fastening members.

3. A wheel, comprising spaced metallic hub rings, a series of relatively thin flexible metallic disks interposed between and secured to said hub rings and radially converging at uniform angles and abutting against each other at their outer peripheries, said disks having central axle openings registering with the inner peripheries of said hub rings, a pair of flanged felly rings secured to the outer peripheries of said disks, and a tire rim member extending about and secured to said flanged felly rings.

4. A wheel, comprising a series of spaced alternately arranged metallic hub rings and wheel disks, fastening members passing through said hub rings and wheel disks, said wheel disks being of relatively thin flexible metallic material and radially converging at uniform angles into abutting relation at their outer peripheries, angle iron felly rings arranged on opposite sides of the abutting portions of said wheel disks, a central axle member extending through and abutting against the edges of said hub rings and wheel disks, fastening members extending through said felly rings and said abutting portions of said wheel disks, and a felly ring member surrounding and secured to said felly rings.

5. A wheel, comprising spaced hub rings, a series of relatively thin flexible metallic disks interposed between said hub rings and having central openings registering with the inner periphery of the latter, said disks radially converging uniformly toward and abutting against each other at their outer peripheries, an axle member arranged within said hub rings and central openings of said disks, fastening members extending through the latter and said hub rings, and a pair of flanged felly rings extending on opposite sides of the abutting outer peripheries of said disks.

In testimony whereof I affix my signature in the presence of two witnesses.

FRED S. LACK.

Witnesses:
  F. E. LACK,
  CLARENCE LE ROY.